United States Patent [19]

Whittington

[11] 4,389,031
[45] Jun. 21, 1983

[54] PARACHUTE

[76] Inventor: George R. Whittington, P.O. Box 44, East Berlin, Pa. 17316

[21] Appl. No.: 290,408

[22] Filed: Aug. 5, 1981

[51] Int. Cl.³ .............................................. B64D 17/02
[52] U.S. Cl. .............................. 244/145; 244/DIG. 1
[58] Field of Search .................... 244/138 R, 142, 145, 244/146, 153 R, 154

[56] References Cited

U.S. PATENT DOCUMENTS

| | | | |
|---|---|---|---|
| 2,365,184 | 12/1944 | Frieder et al. | |
| 3,199,814 | 8/1965 | Frieder | |
| 3,228,635 | 1/1966 | Hughes et al. | |
| 3,285,546 | 11/1966 | Jalbert | 244/145 |
| 3,428,277 | 2/1969 | Everett, Jr. | 244/142 |
| 3,524,613 | 8/1970 | Reuter et al. | |
| 3,724,789 | 4/1973 | Snyder | 244/145 |
| 3,749,337 | 7/1973 | Jalbert | |
| 3,822,844 | 7/1974 | Sutton | |
| 3,893,641 | 7/1975 | Sutton | |
| 4,015,801 | 4/1977 | Womble et al. | 244/145 |

Primary Examiner—Galen L. Barefoot
Assistant Examiner—Rodney Corl
Attorney, Agent, or Firm—Thomas Hooker

[57] ABSTRACT

A generally flat ram air parachute having a central recess with a high lower skin angle. The major suspension lines along the leading edge portion increase in length outwardly to either side of the center of the leading edge. The angle of the lower skin at the center portion of the canopy is greater than at the sides. The parachute is a single inflated cell with an improved interior support structure joining the upper and lower fabric skins.

9 Claims, 15 Drawing Figures

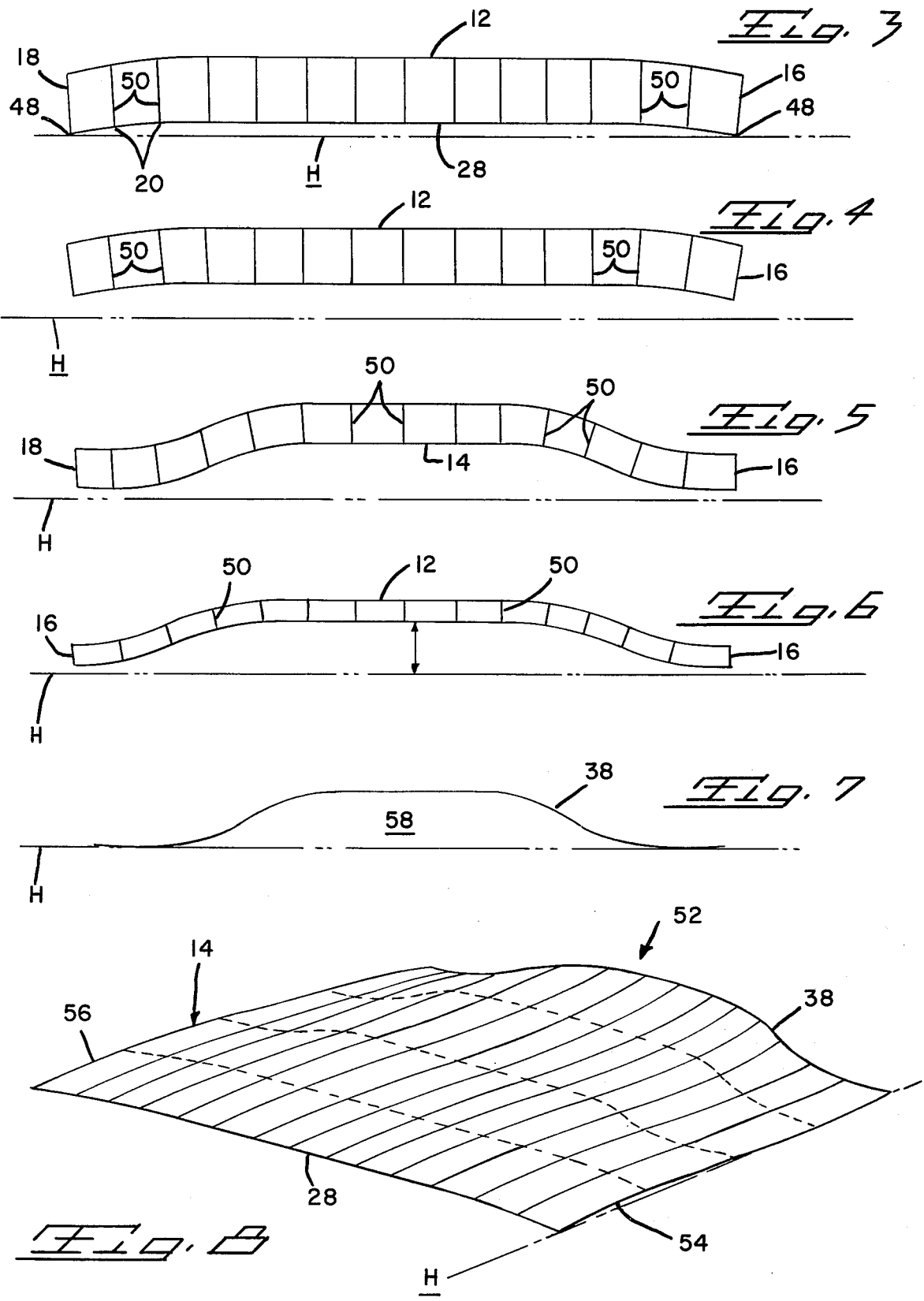

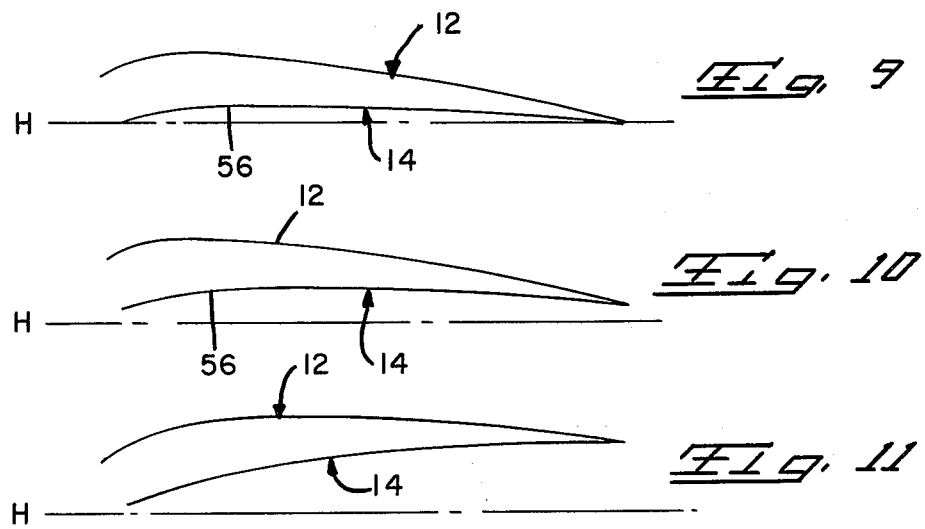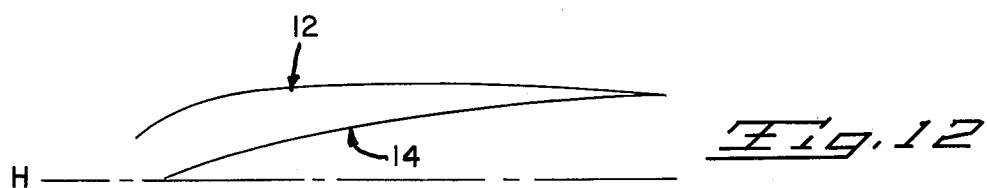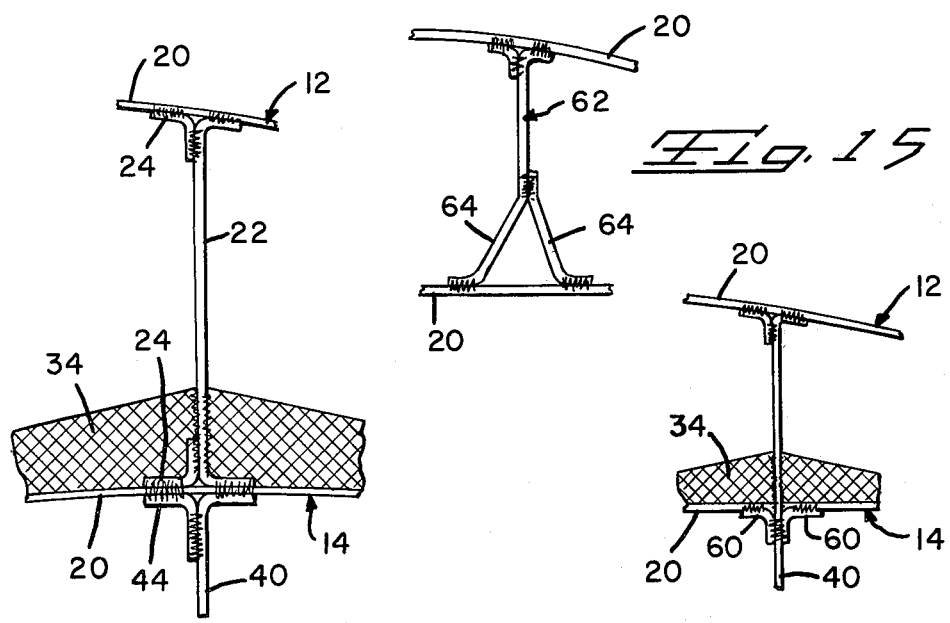

PARACHUTE

The invention relates to a ram air parachute of the type having a generally rectangular configuration with upper and lower skins, and a mouth at the forward edge of the parachute for admitting air into the space between the skins to inflate the parachute to an airfoil shape.

Conventional ram air parachutes include a fabric parachute body having a plurality of individual cells arranged side by side along the width of the parachute and inflatable to assume an airfoil section having a constant angle of attack across the width of the parachute. The major suspension lines extending from the load, conventionally a parachutist, to the parachute are equal in length so that the parachute, as viewed from the front, assumes a curved shape when inflated. The length of the major suspension lines side to side determines the shape of the inflated parachute. Contrast FIGS. 1 and 3 of U.S. Pat. No. 3,822,844. Both figures illustrate the same parachute. In FIG. 1, the parachute is inflated with equal length major suspension lines and has a curved or cylindrical shape. FIG. 3 illustrates the parachute in a theoretical flat inflated shape.

Conventional ram air parachutes are also shown in U.S. Pat. Nos. 3,285,546; 3,524,613 and 3,724,789.

The ram air parachute of the present invention includes a U-shaped generally flat section extending along the side walls and across the front of the parachute and an upwardly extending central recess defining an exit at the trailing edge of the parachute. The upper and lower fabric skins in the parachute define a continuous airfoil from side wall to side wall. In contrast to conventional ram air parachutes in which the lower skin has a continuous angle across the parachute, the angle of the lower skin of the present parachute is shallow or zero at the side walls and, increases inwardly of the side walls to a steeper angle at the central recess. The angle of the lower skin is determined by the acute angle between a horizontal plane and a straight line extending front-to-back from the leading edge to the trailing edge of the lower skin.

The angle of the lower skin at the recess provides forward speed for the parachute to assure sufficient air flows into the mouth to inflate the parachute. The angle of the lower skin at the central recess is greater than the angle of the lower skin of conventional ram air parachutes and the angle of the lower skin at the flat sides of the parachute is less than the angle of the lower skin of the conventional ram air parachute.

The major suspension lines across the front of the parachute increase in length away from the midpoint of the parachute so that the load, conventionally a parachutist, may be suspended closer to the flat parachute than in conventional ram air parachutes with sets of equal length suspension lines and curved air foils. The forward speed of the parachute is primarily provided by the centrally located recess. The single cell parachute has less tendency to collapse than conventional ram air parachutes because pressure is equalized within the canopy.

The parachute includes an improved inner suspension system for maintaining separation between upper and lower parachute skins. In a first embodiment of the inner suspension system, suspension lines extend between the skins with fabric flares sewn to the inner surface of the lower skin attached to the inner suspension lines so that the flares prevent the bottom skin from being deformed outwardly of the parachute. In another embodiment, the interior suspension system includes inverted Y-shaped suspension lines with the upper single line attached to the upper skin and the divergent lower lines attached to the lower skin to prevent outward deformation of the lower skin.

Other objects and features of the invention will become apparent as the description proceeds, especially when taken in conjunction with the accompanying drawings illustrating the invention, of which there are three sheets and one embodiment.

IN THE DRAWINGS

Figure 1:
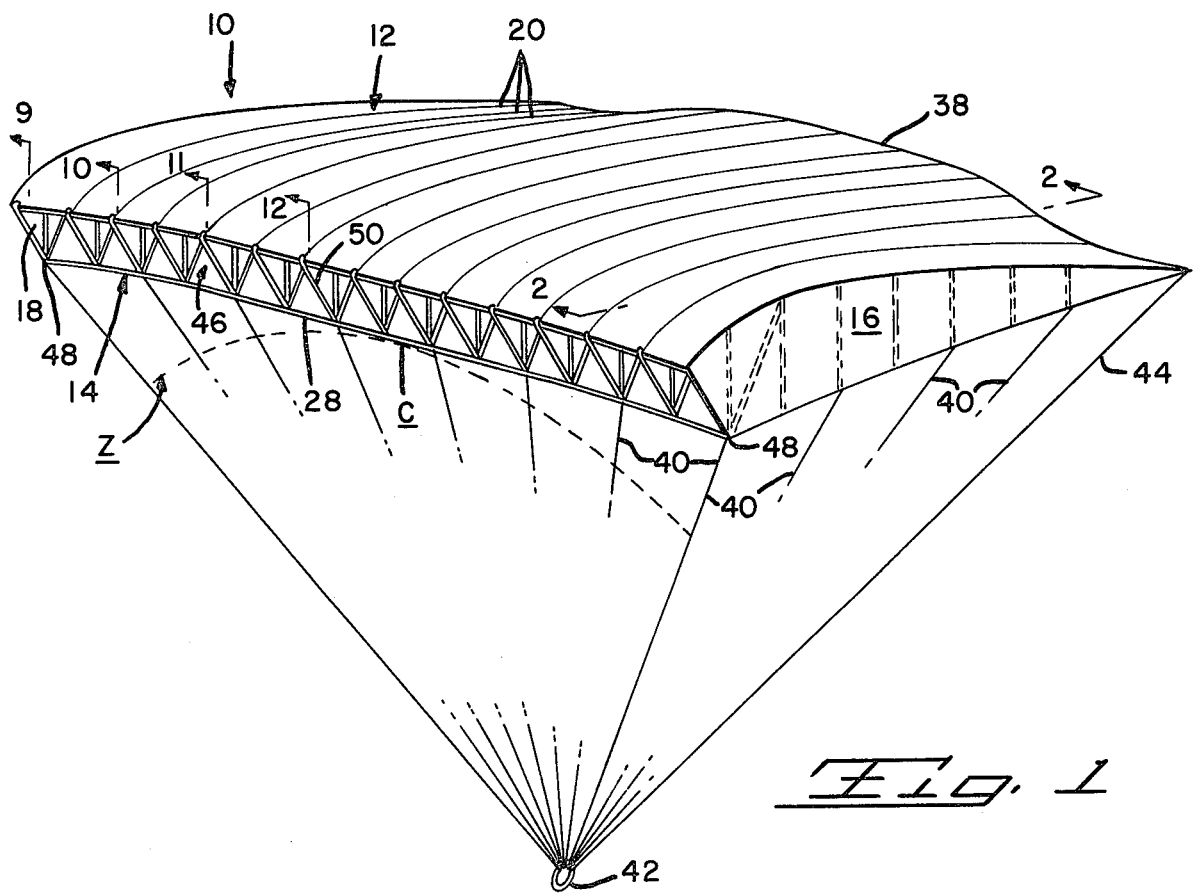
FIG. 1 is a perspective view of an inflated parachute according to the invention.
Figure 2:
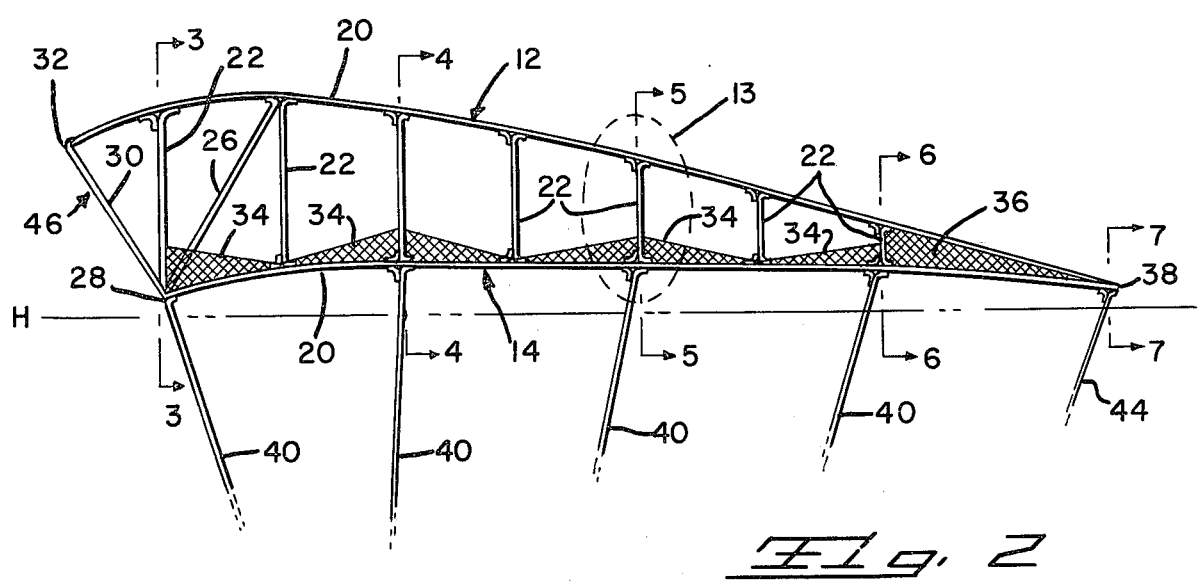
FIG. 2 is a sectional view taken between the leading and trailing edges of the parachute along line 2—2 of FIG. 1.

FIGS. 3 through 7 are sectional views across the parachute taken respectively along lines 3—3, 4—4, 5—5, 6—6 and 7—7 of FIG. 2;

FIG. 8 is a perspective view of the upper surface of the lower parachute skin only;

FIGS. 9 through 12 illustrate the shape of the upper and lower skins of the parachute between the leading and trailing edges at positions 9, 10, 11 and 12 shown in FIG. 1; and FIGS. 13, 14 and 15 illustrate structural details of the interior of the parachute, FIG. 13 being taken at section 13 of FIG. 2.

FIG. 1 illustrates an inflated ram air parachute 10 including upper and lower fabric skins 12 and 14, and fabric side walls 16 and 18. The upper and lower skins are preferably formed from a number of fabric panels which extend from the leading to the trailing edges of the parachute and are sewn to adjacent panels, creating seams 20 extending front to back across both skins at regular intervals across the width of the parachute. The seams in the upper skin are above the seams in the lower skin. If desired, the parachute may use single-panel skins with tape stitched on to the skins for reinforcement where lines are attached to the skins.

As illustrated in FIG. 2, the interior of the parachute includes a number of front-to-back sets of inner suspension lines 22 extending between the upper and lower skins 12 and 14 and joining adjacent fabric seams in the skins. The ends of each inner suspension line 22 are sewn flush onto the inner surface of the upper and lower skins. Line segments 24 are sewn to both the skins and the ends of the suspension lines to reinforce the connections.

Referring now to FIG. 2, the front-to-back sets of inner suspension lines attached to the outer suspension lines include an anti-collapse line 26 extending from the leading edge 28 of the lower skin diagonally upwardly and rearwardly to the upper skin. A forward inner suspension line 30 extends from the lower skin leading edge 28 forwardly and upwardly to the leading edge 32 of upper skin 12. Triangular fabric flares 34 are sewn to the bottom seams 20 and extend upwardly to apexes attached to alternate inner suspension lines. The flares prevent outward bowing of the lower skin when the parachute is inflated. A trailing edge shaping fabric 36 is sewn to the seams 20 from the rearmost inner suspension line 22 to the preferably closed trailing edge 38. This fabric aids in maintaining the shape of the trailing edge of the parachute.

Suspension lines 22, 26 and 30 are provided at the spaced seams across the width of the parachute and at the parachute side walls 16 and 18. Flares 34 and the shaping fabrics are provided on each set of suspension lines inwardly of the parachute side walls. The upper and lower skins 12 and 14 of the parachute are spaced apart by the inner suspension lines to define an airfoil shape in a front-to-back section. FIGS. 9, 10, 11 and 12 illustrate the shape of the airfoil section at different locations across the parachute.

Major exterior suspension lines 40 extend from a parachute load point 42 upwardly to the lower skin of the parachute. As illustrated in FIG. 2, the upper end of each suspension line 40 is sewn to the bottom of skin 14 at a seam 20 or side wall immediately below an inner suspension line 22. Reinforcements 44, similar to reinforcements 24, are sewn to the ends of lines 40 and to the seam. The ends of the lines and reinforcements 40 and 44 are preferably stitched together and to the ends of lines 22 and reinforcements 24 to provide secure force-transmitting connections from lines 40 across the lower skin and to the interior suspension lines 22. In this way, the load-bearing force on lines 40 is transported directly through the lower parachute skin 14 to upper parachute skin 12. The lines 40 are secured to inner suspension lines 22 joining alternate pairs of seams 20. The remaining interior suspension lines maintain the shape of the parachute between the major suspension lines 40.

Control lines 44 extend from load 42 to the parachute trailing edge 38 adjacent side walls 16 and 18. Pulling on the control lines on one side of the parachute enables the parachutist to slow air flowing past that side and turn the parachute. Pulling on both control lines slows the parachute.

The parachute includes a forward angled mouth 46 defined by the leading edges of the upper and lower skins and side walls. During descent, air flows through the mouth 46 and into the single-cell interior of the parachute, inflating the parachute. In FIGS. 3 through 7, line H represents a horizontal plane passing through the lower front corners 48 of mouth 46.

As shown in FIG. 3, the parachute is essentially horizontal in the center and curves downwardly slightly at the outer sets of inner support lines 50. The inner suspension lines maintain a fixed spacing between the upper and lower skins to maintain the airfoil shape.

FIG. 4 illustrates the shape of the parachute at the second support lines 40. The parachute is raised above plane H. The central portions of the upper and lower skins are approximately the same width as the corresponding portions of FIG. 3 with a downward curve at either edge of the parachute at the outer two sets of inner support lines 50.

FIG. 5 illustrates the parachute at the third set of suspension lines 40. In comparison with FIG. 4, the thickness of the parachute is reduced as sections near the trailing edge 38. The central flat portions of upper and lower skins 12 and 14 are elevated above that of FIG. 4 while the width of the elevated portion is reduced to that of about 5 series of inner support lines 50 and the downwardly curved portions to either side of the flat portion are correspondingly increased in lateral extent.

In FIG. 6, taken at the last inner suspension lines 22, the thickness of the parachute is further reduced, the height of the central flat portion is increased above plane H and each side of the parachute bows up to the central flat portion.

FIG. 8 illustrates in perspective the shape of the lower skin 14 of parachute 10. At the leading edge 28, the skin is nearly horizontal and is turned down slightly at corners 48. Away from the leading edge, the center of the lower skin slopes up rearwardly above the plane H to form an elevated central recess 52. The recess 52 projects upwardly from the middle of the generally horizontal leading edge 28 to the upwardly curved trailing edge 38 shown in FIG. 7. The recess is bounded on three sides of the lower skin by a generally flat U-shaped section of the lower skin. The parachute sides are slightly curved as they form the lower side of the parachute airfoils illustrated in FIGS. 9 and 10. The central recess extends to the trailing edge 38 of the prachute to provide a reduced width exit 58 for air during descent.

FIGS. 9 through 12 illustrate the airfoil sections of parachute 10 as defined by the spacing of the upper and lower fabric skins 12 and 14 at spaced locations to one side of the lateral center C of the parachute. See FIG. 1. The parachute is symmetrical to either side of the center C.

The airfoil of FIG. 12 is within the central recess 52 and has an angle along the lower skin greater than that of a conventional ram air parachute, typically as illustrated in U.S. Pat. No. 3,724,789. The angle of the lower skin at the sides of the parachute may be shallow or zero.

The steep angle of the lower skin at the recess 52 provides forward speed for the parachute. The flatter sides stabilize the parachute during descent and aid in supporting the load.

As illustrated in FIG. 1, the series of suspension lines or shrouds 40 at the front of the parachute vary in length from the longest shrouds extending to the side walls of the parachute to the shortest shrouds which extend to the pairs of inner support lines 50 located to either side of the parachute center C. Line Z is equidistant from load point 42 and indicates the additional length of the forward support lines 40 to either side of the center of the parachute. In this way, the front of the lower skin is maintained essentially flat along the leading edge. The load point 42 may be located closer to the parachute then in conventional ram air parachutes.

In the conventional ram air parachute using equal length shrouds side-to-side across the parachute, the lower surface of the parachute necessarily lies on an arc and it is not possible to attain the desired generally flat configuration of parachute 10. The raised location of the load point 42 in parachute 10 increases the stability of the parachute making it more maneuverable and safer. Swinging is reduced.

FIGS. 14 and 15 illustrate alternative embodiments for the parachute inner suspension lines. In FIG. 14, major suspension line 40 extends up through seam 20 in the lower fabric skin 14 and is secured to the seam 20 in the upper fabric skin 12 in the same way the inner suspension 22 line is secured to fabric 12 in FIG. 13. Reinforcements 60 further secure line 40 to the lower skin. The triangular flares 34 are provided in FIG. 14.

FIG. 15 illustrates an alternative type of inner suspension line used to join the top and bottom seams between the load-bearing inner suspension lines of a single row of suspension lines and in rows on seams between the rows of load-bearing suspension lines. Flares are not used. In this case, the upper end of inverted Y-shaped interior suspension line 62 is secured to the upper seam 20 in the same way line 22 is secured in FIG. 13. The lower legs 64 of line 62 are sewn to the lower seam 20 at spaced locations on lower seam 20 to provide spaced support for the lower skin. In this way, the spaced support performs the same function as flares 34 in preventing the lower skin from being deformed outwardly of the parachute and distorting the airfoil shape of the parachute.

The drawings of the inflated parachute are idealized to the extent that when the parachute is inflated the load supporting seams 20 in the upper and lower skins are lower than the adjacent non-load supporting seams 20 so that the skins assume a somewhat jagged or sawtooth shape in lateral sections. For this reason, the individual skin segments between seams or, in the case of single-panel upper and lower skins, between reinforcing tapes are curved laterally. This jagged or sawtooth skin shape is conventional in inflated in ram air parachutes. The generally flat sections of the described parachute include these lateral curved sections in the skins. "Generally flat" as used herein refers to the shape of the lower skin since the upper skin, as illustrated in FIGS. 2 and 9 through 12 has an airfoil shape.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A ram air parachute having upper and lower skins, a mouth on the forward edge, a trailing edge, side walls, major suspension lines extending from the lower skin to a load and an inner suspension system maintaining separation between the upper and lower skins, the parachute having an airfoil shape in sections from the mouth to the trailing edge, the improvement comprising the lower skin having a U-shaped generally flat section extending along the side walls and mouth and an upwardly extending central recess located within the U-shaped section of the lower skin and including a portion of the trailing edge located above the trailing edge adjacent the side walls of the parachute to define an exit, the lower skin at said central recess having a steep angle and the lower skin adjacent the side walls having a low or zero angle whereby the central recess provides stable forward drive.

2. A parachute as in claim 1 wherein the trailing edge to either side of the central recess is generally straight.

3. A parachute as in claim 2 wherein said central recess includes a generally flat portion and curved portions to either side thereof extending between the flat portion of the recess and the flat portions of the U-shaped parachute section adjacent the parachute side walls.

4. A parachute as in claim 1 wherein said inner suspension system includes fabric flares secured to the lower skin and interior suspension lines extending between the skins and secured to the flares whereby the interior suspension lines and flares hold the lower skin against outward deformation.

5. A parachute as in claim 4 wherein the major suspension lines are arranged in rows extending from the mouth to the trailing edge across the lower skin and are secured to said inner suspension lines for transmitting loads to the upper skin, and including additional rows of inner suspension lines and flares extending from the mouth to the trailing edge of the parachute between the rows of major suspension lines.

6. A parachute as in claim 5 wherein the flares are triangular in shape.

7. A parachute as in claim 1 wherein the inner suspension system includes a row of suspension units, each unit including one line attached to the upper skin at a first location and two lines attached to the lower skin at spaced locations to either side of said first location.

8. A parachute as in claim 7 wherein the suspension units are inverted Y-shaped.

9. A parachute as in claim 1 wherein the suspension lines adjacent the mouth increase in length to either side of the center of the parachute.

* * * * *